US012681648B2

(12) United States Patent
Sehgal et al.

(10) Patent No.: US 12,681,648 B2
(45) Date of Patent: Jul. 14, 2026

(54) NONVOLATILE MEMORY ACCESS VIA MEMORY INTERCONNECT SYSTEMS

(71) Applicant: Micron Technology, Inc., Boise, ID (US)

(72) Inventors: Rohit Sehgal, Boise, ID (US); Eishan Mirakhur, Boise, ID (US); Vishal Tanna, Boise, ID (US); Rohit Sindhu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/941,567

(22) Filed: Sep. 9, 2022

(65) Prior Publication Data

US 2023/0236742 A1     Jul. 27, 2023

Related U.S. Application Data

(60) Provisional application No. 63/302,047, filed on Jan. 22, 2022.

(51) Int. Cl.
*G06F 3/06*          (2006.01)
(52) U.S. Cl.
CPC .......... *G06F 3/0625* (2013.01); *G06F 3/0659* (2013.01); *G06F 3/0673* (2013.01); *G06F 3/0679* (2013.01)
(58) Field of Classification Search
CPC .... G06F 3/0625; G06F 3/0659; G06F 3/0673; G06F 3/0679
See application file for complete search history.

(56) References Cited

U.S. PATENT DOCUMENTS

| | | | | |
|---|---|---|---|---|
| 4,924,210 A * | 5/1990 | Matsui | ................. | G06K 7/0008 340/505 |
| 2001/0019509 A1 * | 9/2001 | Aho | .................... | G06F 12/0638 711/E12.083 |
| 2006/0149857 A1 * | 7/2006 | Holman | .............. | G06F 13/1694 710/3 |
| 2007/0076685 A1 * | 4/2007 | Seto | ........................ | H04L 69/32 370/428 |
| 2007/0229884 A1 * | 10/2007 | Tanaka | .................. | G06F 3/1286 709/201 |

(Continued)

OTHER PUBLICATIONS

Rambus Press; https://www.rambus.com/blogs/compute-express-link/#protocols ; Jan. 2024 (Year: 2024).*

*Primary Examiner* — Eric T Loonan
(74) *Attorney, Agent, or Firm* — Wood IP LLC; Theodore A. Wood

(57) ABSTRACT

A memory card, for use with a host system, combines both: (i) non-volatile memory express (NVMe) data storage such as a solid state drive (SSD) with (ii) dynamic random access memory (DRAM) conforming to the computer express link (CXL) protocol. The SSD and CXL DRAM share a common controller. CXL memory requests from the host system are handled according to the CXL.io protocol. NVMe data requests are wrapped into a CXL request packet. The common front end identifies the NVMe data request(s) within the CXL packet, parses the NVMe data request, and routes the request to the NVMe memory. A host operating system software driver intercepts the NVMe memory requests and wraps them into the CXL request packet.

10 Claims, 7 Drawing Sheets

(56)  References Cited

U.S. PATENT DOCUMENTS

| | | | |
|---|---|---|---|
| 2012/0311371 A1* | 12/2012 | Shaeffer | G06F 13/287 |
| | | | 713/501 |
| 2013/0054822 A1* | 2/2013 | Mordani | H04L 69/40 |
| | | | 709/228 |
| 2013/0054882 A1* | 2/2013 | Ryu | G06F 3/0664 |
| | | | 711/E12.019 |
| 2017/0255398 A1* | 9/2017 | Niu | G06F 3/0632 |
| 2018/0063145 A1* | 3/2018 | Cayton | G06F 16/9535 |
| 2019/0115059 A1* | 4/2019 | Ware | G11C 7/1057 |
| 2020/0133903 A1* | 4/2020 | Chen | G06F 13/1689 |
| 2020/0327088 A1* | 10/2020 | Choudhary | G06F 13/4221 |
| 2021/0081312 A1* | 3/2021 | Coury | G06F 12/0813 |

* cited by examiner

Legacy System

100

Host
110

PCIe-Bus
115

116

117

NVMe SSD
(flash-based storage)
120

122

CXL + DRAM
125

Table 1

| Opcode | | | | Required* | Input Payload Size (B) | Output Payload Size (B) |
|---|---|---|---|---|---|---|
| Command Set Bits[15:8] | | Command Set Bits[7:0] | | Combined Opcode | | |
| 01h   Events | | 00h | Get Event Records ( Section 8.2.9.1.2 ) | 0100h | M | 1 | 20h+ |
| | | 01h | Clear Event Records ( Section 8.2.9.1.3 ) | 0101h | M | 8+ | 0 |
| | | 02h | Get Event Interrupt Policy ( Section 8.2.9.1.4 ) | 0102h | M | 0 | 4 |
| | | 03h | Set Event Interrupt Policy ( Section 8.2.9.1.5 ) | 0103h | M | 4 | 0 |
| 02h   Firmware Update | | 00h | Get FW Info (Section 8.2.9.2.1) | 0200h | O | 0 | 50h |
| | | 01h | Transfer FW (Section 8.2.9.2.2) | 0201h | O | 80h+ | 0 |
| | | 02h | Activate FW (Section 8.2.9.2.3) | 0202h | O | 2 | 0 |
| 03h   Timestamp | | 00h | Get Timestamp (Section 8.2.9.3.1) | 0300h | O | 0 | 8 |
| | | 01h | Set Timestamp (Section 8.2.9.3.2) | 0301h | O | 8 | 0 |
| 04h   Logs | | 00h | Get Supported Logs (Section 8.2.9.4.1) | 0400h | M | 0 | 8 |
| | | 01h | Get Log (Section 8.2.9.4.2) | 0401h | M | 18h | 0 |

310 {
312 { CXL.io

315 {  NVMe Memory Read/Write commands

FIG. 3

NONVOLATILE MEMORY ACCESS VIA MEMORY INTERCONNECT SYSTEMS

CROSS REFERENCE TO RELATED APPLICATIONS

This application claims benefit to U.S. Provisional Patent Application No. 63/302,047, filed Jan. 22, 2022, and entitled "NON-VOLATILE MEMORY EXPRESS (NVME) OVER COMPUTE EXPRESS LINK (CXL).IO," the disclosure of which is incorporated herein in its entirety by reference.

TECHNICAL FIELD

The present disclosure relates generally to one or more systems for memory. The present disclosure relates more particularly to managing memory reads and memory writes for different kinds of memory storage that may use different memory management protocols, via a common memory controller.

BACKGROUND

Memory devices (also referred to as "memory media devices") are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Application specific integrated circuits (ASICs) may be designed and used for many different purposes in computers, cell phones, and other digital systems and control systems. For example, an ASIC may regulate access to dynamic random-access memory (DRAM) by a computer's central processing unit (CPU) or by a cell phone's microprocessor. As a second example, a first flash memory controller ASIC may regulate read and write operations to flash memory, such as may be used in solid state drives. As a further example, a second computer express link (CXL) ASIC may function as a controller to both regulate dynamic memory, and to integrate different digital memory circuits according to recently emerging hardware standards.

A computer, cell phone, or other digital/control system may issue multiple service requests to an ASIC, including for example, memory read/write requests, service interrupts, or other forms of service requests to the ASIC (e.g., interrupt-driven requests for ASIC input/output (I/O) activities). In conventional memories and memory controllers, there is a need for cost reductions in terms of using a single, common controller for both dynamic memory storage and non-volatile memory storage. Particularly, there is a need for a single, common controller for CXL DRAM memory and NOT-AND (NAND) flash-based storage systems such as is used in solid state drives.

BRIEF DESCRIPTION OF THE DRAWINGS

Advantageous designs of embodiments of the present disclosure result from independent and dependent claims, the description, and the drawings. In the following, preferred examples of embodiments of the disclosure are explained in detail with the aid of the attached drawings. The drawings, which are incorporated herein and form part of the specification, illustrate the present disclosure and, together with the description, further serve to explain the principles of the disclosure and to enable a person skilled in the relevant art(s) to make and use the disclosure.

FIG. 1 illustrates an exemplary configuration of a computer system according to legacy configurations and methods.

FIG. 3 presents a table which lists exemplary CXL device command opcodes that may be included in a CXL.io packet.

Figure 2:
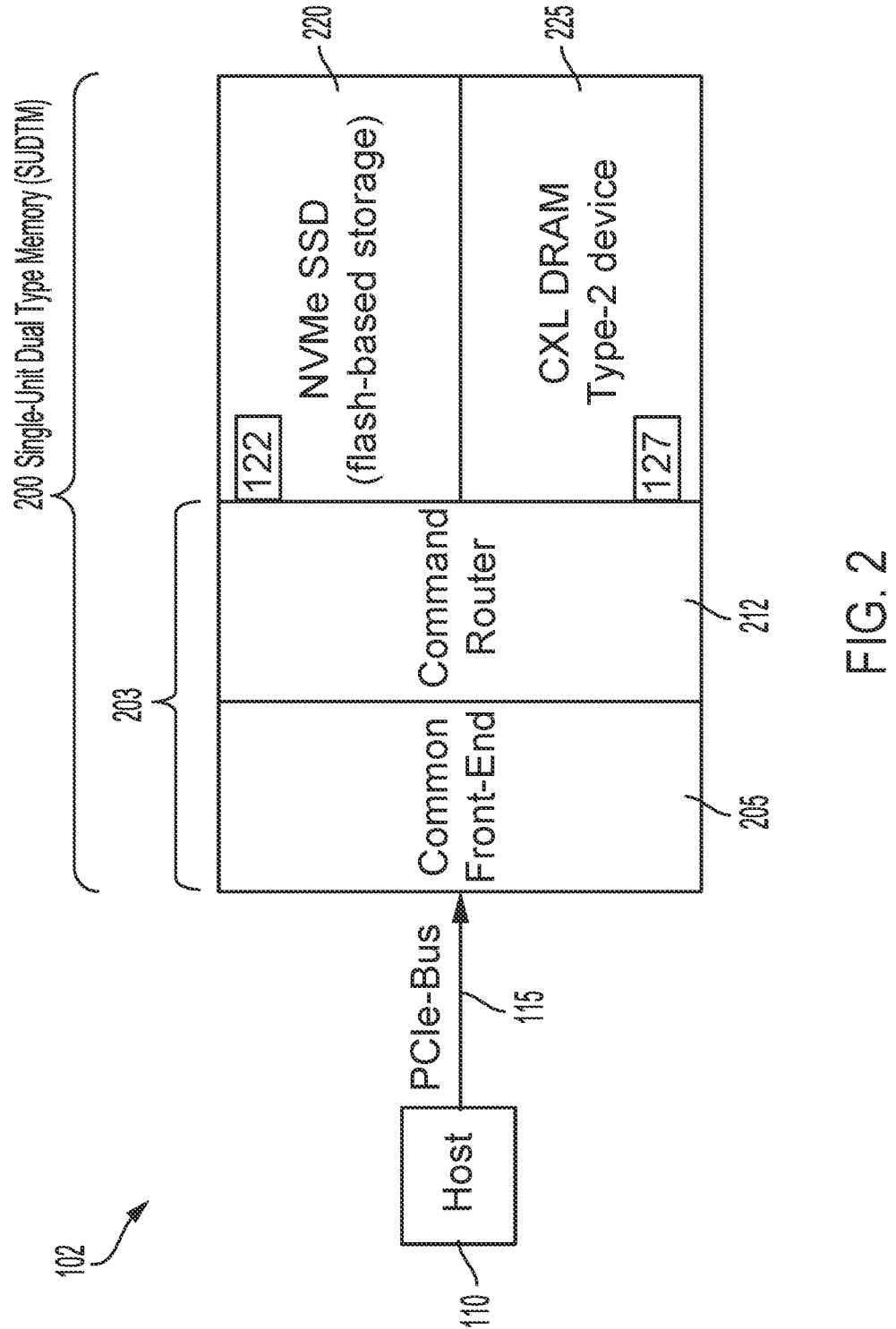
FIG. 2 illustrates an exemplary configuration of a computer system according to the present embodiments.

In this document, illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

Figure 1:
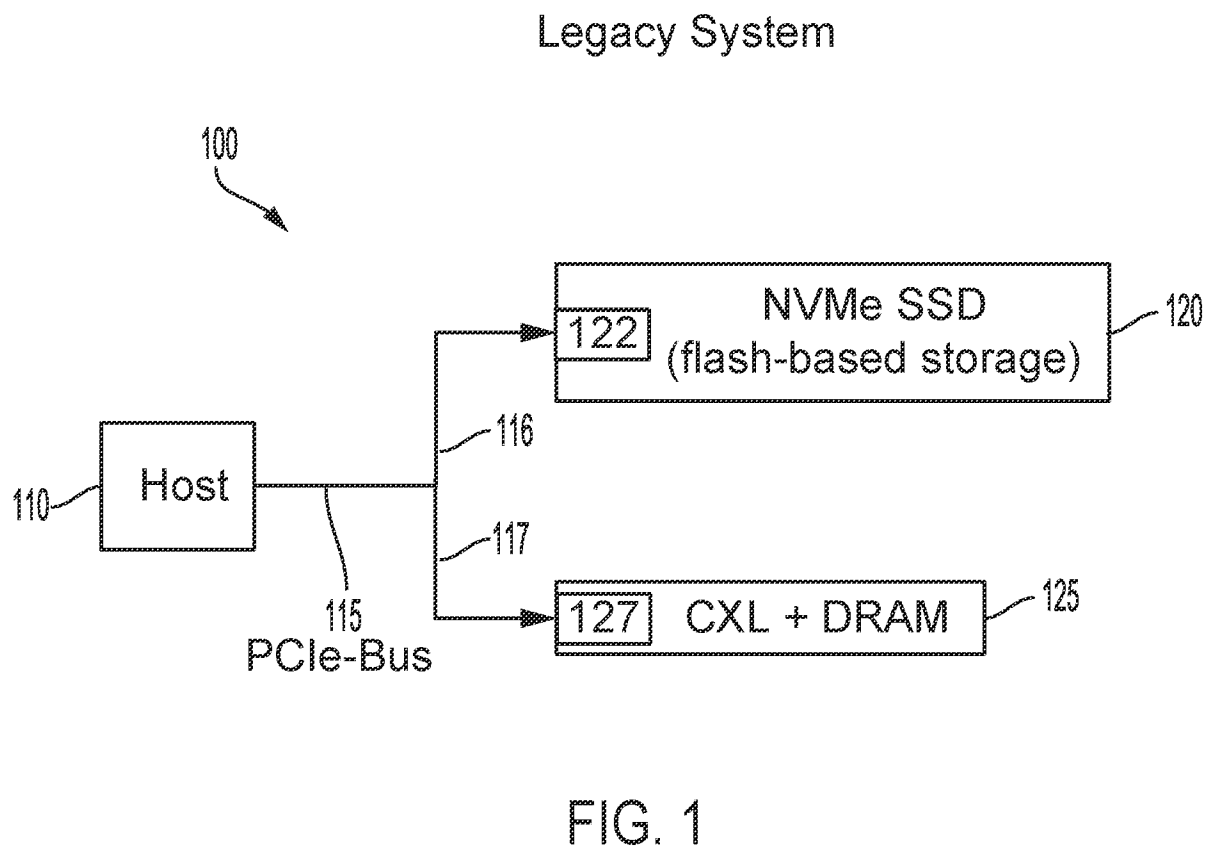

CXL is an open standard, cache-coherent interconnect for processors, memory, and memory expansion in a computer system 100, 102 (see FIGS. 1, 2). CXL technology maintains memory coherency between a host system 110 memory space and memory on attached devices such as for example a solid state drive (SSD) 120 or CXL DRAM 125. The host system 110 typically has its own processor and other dynamic random access memory in addition to the CXL ASIC.

FIG. 1 illustrates an exemplary configuration of a computer system 100 according to legacy configurations and methods. In addition to the host 110, the system 100 may include a communications bus such as a peripheral component interconnect express (PCIe) bus 115.

Figure 4A:
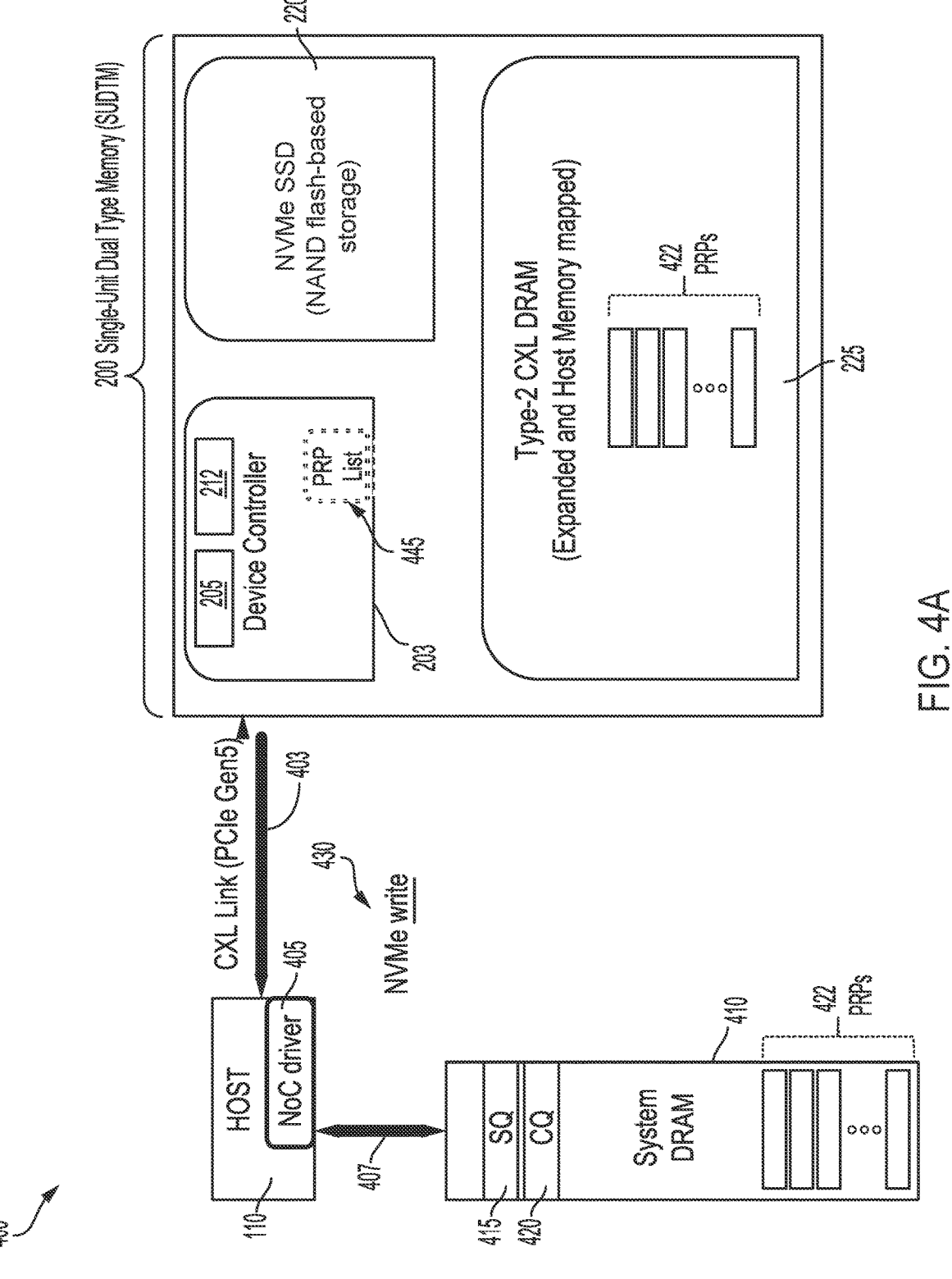
FIG. 4A presents a system diagram for processing an NVMe memory command via a CXL.io protocol according to the present embodiments.
Figure 4B:
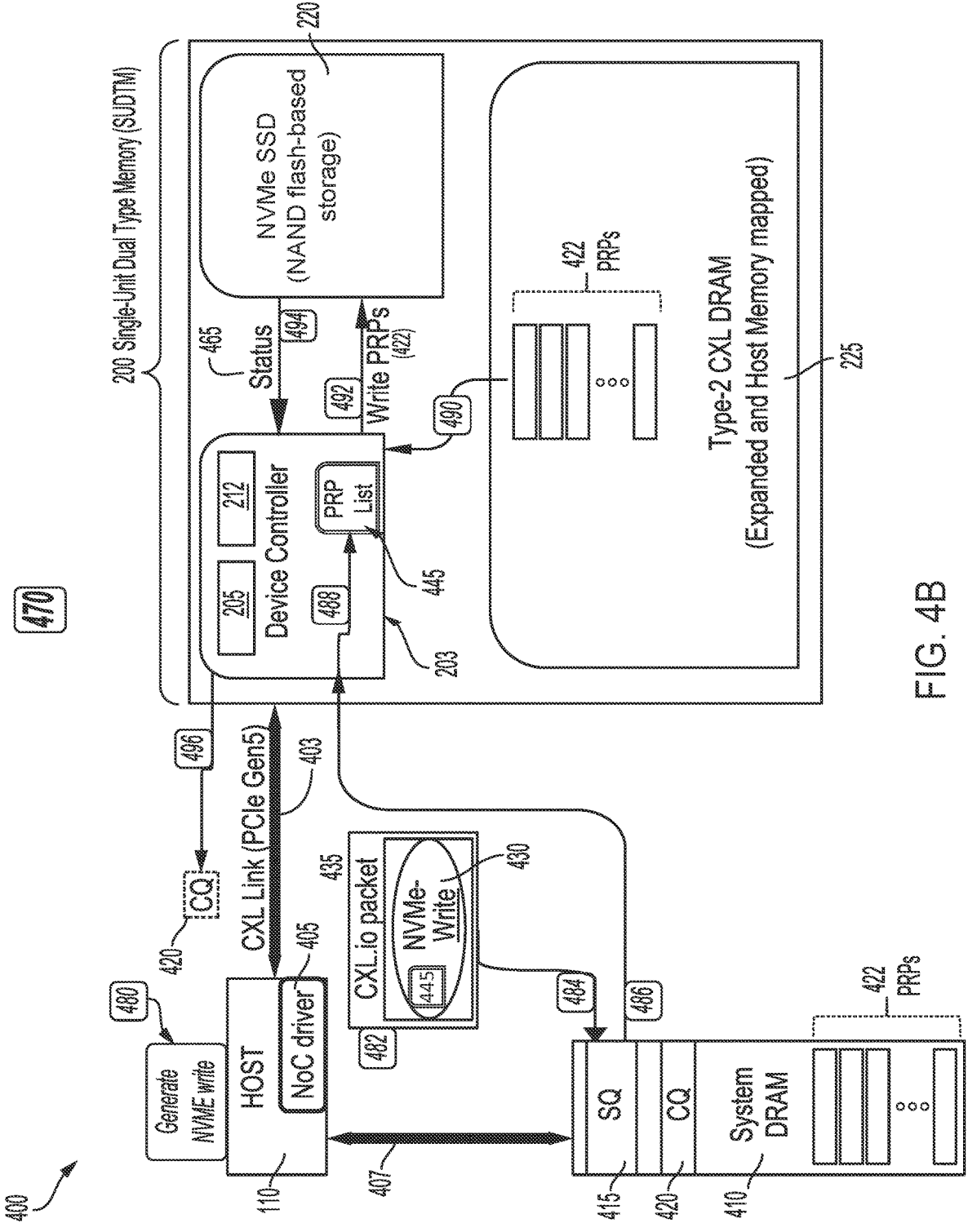
FIG. 4B presents a combined data flow illustration and flow chart for processing an NVMe memory command via a CXL.io protocol according to the present embodiments.
Figure 5:
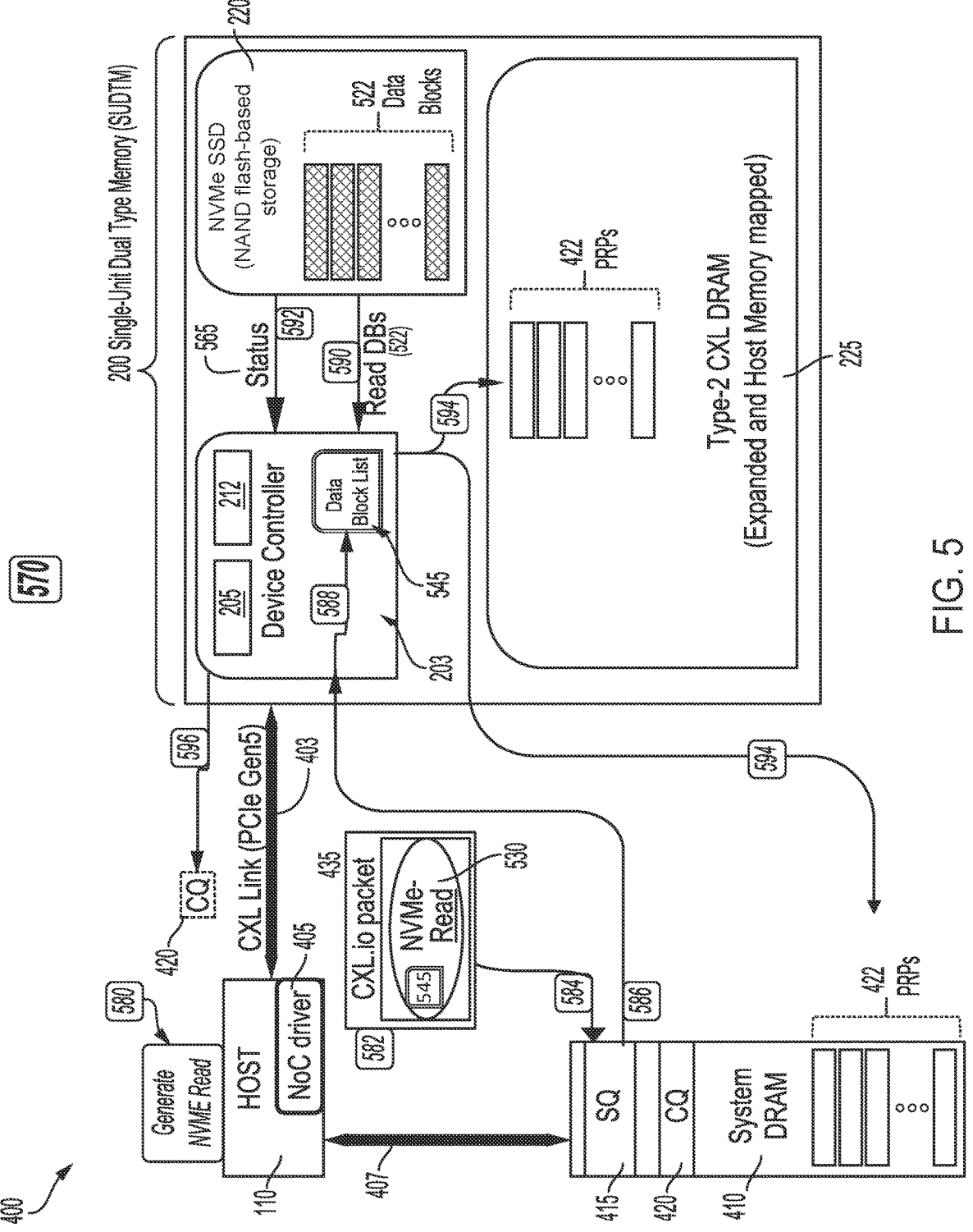
FIG. 5 presents a combined data flow illustration and flow chart for processing an NVMe memory command via a CXL.io protocol according to the present embodiments.

The host 110 is a source of data write commands 430 (see FIG. 4) and data read requests 530 (see FIG. 5). In system 100, the PCIe bus 115 maintains separate physical data paths 116, 117 to separate the memory devices, such as the SSD 120 and the CXL DRAM 125. Consequently, memory requests (read/write) are carried to and from a first memory controller 122 for the SSD 120 and a second memory controller 127 for the CXL DRAM 125. The legacy architecture uses the NVME protocol to communicate with NVME based SSDs 120 and uses the CXL based protocol to communicate with CXL based CXL DRAM devices 125.

As discussed immediately below, the present embodiments employ a common front end 205 for the memory device (see FIG. 2), which will accept NVME over CXL.io protocol. The common, shared front end 205 of the memory module couples with a command router 212 to determines if the memory request packet received carries a CXL.io memory request or an NVMe memory request. The command router 212 then routes the memory request to the appropriate storage device. This is discussed further immediately below.

FIG. 2 illustrates an exemplary configuration of a computer system 102 according to the present embodiments. In the exemplary computer system 102, the host 110 employs the PCIe bus 115 to connect to a single-unit, dual type memory (SUDTM) device 200. The SUDTM device 200 has (onboard) a NAND flash-memory based storage, which may, for example, be an NVMe SSD 220 (similar to the SSD 120 of the system 100). The SUDTM device 200 may also include a double data rate (DDR) CXL DRAM device 225 (e.g., Type-2 CXL DRAM), which is functionally similar to the CXL DRAM 125 of computer system 100. In alternative embodiments, the SUDTM device 200 may be a multi-type memory device that has three or more types of storage devices.

The SUDTM device 200 has a single, shared device controller 203 which includes a common front end 205 and a command router 212. The common front end 205 communicatively links the SUDTM device 200 with the host 110 via the PCIe bus 115. The front end 205 is configured to receive CXL.io packets 435 (see FIG. 4) from the host 110 via the PCIe bus 115. As discussed further below, the CXL.io packets 435 may contain CXL read/write commands. A CXL.io packets 435 from the host 110 may also include NVMe write commands 430 and/or NVMe read commands 530. In this way, the embodiments of the present system employ CXL.io packets 435 as a shared data vehicle for handling reads/writes for both NAND flash storage, such as the NVMe SSD 220, and for the CXL DRAM device 225.

The command router 212 of the device controller 203 is either a hardware device or software/firmware configured to route CXL write/read commands to the CXL DRAM device 225. The command router 212 is also configured to route NVMe write/read commands 430, 530 to the NVMe SSD 220.

Onboard the exemplary SUDTM device 200, the flash-based storage such as the NVMe SSD 220 may have its own memory controller 122. Similarly, the CXL DRAM device 225 may have its own respective memory controller 127. However, these controllers will interface with the shared command router 212, thereby reducing the management burden on the host 110, a host CPU (not shown in the figures), and the PCIE bus 115.

FIG. 3 presents Table 1, which lists exemplary CXL device command opcodes 310 that may be included in a CXL.io packet. A first set of commands 312 are part of the established CXL.io protocol and are intended to carry CXL data read, and data write commands, among other kinds of commands.

Table 1 also reflects additional, exemplary command opcodes 315 according to the embodiments. These additional opcodes 315 are an extension of the CXL specification and represent opcodes which may include as input payload NVMe read/write commands 530/430. As part of memory read/write operations, the command router 212 is configured to identify and distinguish CXL data read/write commands 312 from NVMe read/write command sets 315. As such commands are identified and distinguished, the command router 212 is configured to route the read/write commands to either the NVMe SSD 220 or the CXL DRAM device 225, as appropriate.

FIG. 4A presents a system diagram for processing an NVMe memory command via a CXL.io protocol according to the present embodiments. FIG. 4 includes an exemplary computer system 400, similar to the computer system 102 of FIG. 2.

The computer system 400 includes the host 110, discussed above. The host 110 includes an NVMe-over-CXL (NoC) driver 405 (e.g., a software driver loaded into the driver layer of a computer operating system). The NoC driver 405 may be stored in the form of machine level code, byte code, firmware, or similar code capable of instructing a processor to perform the operations described herein.

The host 110 may be coupled to exemplary system DRAM 410 via a bus 407. By way of example, the bus 407 may be a PCIe bus. In an embodiment, the host 110 may initially load software for the NoC driver 405 into the DRAM 410 as part of loading an operating system from a flash-based storage such as the NVMe SSD 220. In the embodiments, the DRAM 410 may set aside or reserve memory for a submission queue (SQ) 415 and a completion queue (CQ) 420.

The SQ 415 is a circular buffer with a fixed slot size that host software uses to submit memory commands (e.g., doorbell commands) for execution by the device controller 203. The front end 205 of the device controller 203 fetches SQ entries in order from the SQ 415. The device controller 203 may execute those commands in any order. Each SQ entry may be a CXL command, for example, 64 bytes in size.

Physical memory locations in a memory of the host 410 used for data transfers are specified using Physical Region Page (PRP) entries 422. Each doorbell command may include two PRP entries 422. If more than two PRP entries 422 are necessary to describe the data buffer, a pointer to a PRP List 445 (describing a list of PRP entries) may be provided.

The CQ 420 is a circular buffer used to post statuses for completed memory commands. The SQ 415 can temporarily store a list of NVMe read/write commands target for the NVMe SSD 220. The CQ 420 is used to store a record of NVMe write blocks 430 which have been successfully stored in or read from the SUDTM device 200. As discussed further below, the device controller 203 retrieves memory commands from the SQ 415 and stores completion indications in the CQ 420.

The computer system 400 includes the SUDTM device 200 already discussed above (see FIG. 2). As per FIG. 2, the SUDTM device 200 has a device controller 203 which includes both the command front end 205 and the command router 212. The SUDTM device 200 also has a flash-based storage such as the NVMe SSD 220, which in embodiments may be a NAND flash-based storage. The SUDTM device 200 also has the CXL DRAM device 225, which in embodiments may serve as expanded memory or host-memory mapped.

The host 110 may be communicatively linked to the SUDTM device 200 via a data bus such as an exemplary CXL link (PCIe Gen 5) data bus 403. The host 110 may also be communicatively linked to the system DRAM 410 via a data bus 407.

In either of the system DRAM 410 or the CXL DRAM device 225, prior to the execution of an NVMe write command 430, the data associated with the NVMe write command 430 will already be stored in physical region pages (PRPs) 422 in either of the system DRAM 410 or the CXL DRAM device 225.

The PRP list 445 lists the pages in the DRAM 410 and the CXL DRAM device 225 where the data is stored. The data may be distributed over both the DRAM 410 and the expanded and host-mapped memory of the CXL DRAM device 225. An NVMe write command 430 (discussed further below) provides instructions for transferring the data in the physical region pages to a non-volatile NAND flash storage such as the exemplary NVMe SSD 220. The embodiments employ a CXL.io packet 435 to convey or "ferry" a wrapped NVMe write command 440 to the device controller 203.

FIG. 4B illustrates the computer system 400 as FIG. 4A with respect to a method 470. The method 470 employs a series of exemplary data processing and data transfer steps to handle an NVMe write request 430 via a CXL.io packet 435.

In block 480, the host 110 generates an NVMe write command 430. At block 482, the NoC driver 405 wraps the NVMe write command 430 into a data field, parameter, or other data section of a CXL.io packet 435. The NVMe write command 430 includes the PRP list 445 of the series of PRPs 422 that are written to the NVMe SSD 220. In block 484, the NoC driver 405 puts the CXL.io packet 435 with the wrapped NVMe write command 430 into the SQ 415.

In block 486, the CXL.io packet 435—with the wrapped NVMe write command 430—is transferred to the device controller 203 of the SUDTM device 200. The device controller 203 includes the command router 212 that includes digital logic to parse the CXL.io packet 435 and identify that the NVMe write command 430 is embedded in the packet 435. In response, the command router 212 determines that the data associated with the NVMe write command 430 must go to the NAND flash storage such as the exemplary NVMe SSD 220. In some embodiments, the command router is configured to parse the memory request by ascertaining a value of a flag in the memory request indicative of the memory access protocol.

As noted above, prior to the execution of the NVMe write command 430, the data associated with the NVMe write command 430 is stored in physical region pages 422 in either the system DRAM 410 or the CXL DRAM device 225. In the next block 488, the command router 212 extracts the PRP list 445 of PRPs 422 required by the NVMe write command 430.

In block 490, the command router 212 extracts the data from the appropriate pages 442 (of either the system DRAM 422 or the CXL DRAM device 225). In block 492, the command router 212 writes the data to the NVME SSD 220. In block 494, the NVME SSD 220 returns a status 465 indicating that the write command is completed. In block 496, the device controller 203 sends a signal to the CQ 420 to update the NVMe write command 430, indicating completion of the command.

In some embodiments, the device controller 203 is a CXL controller capable of understanding that the CXL.io packet 435 may have an embedded NVMe write command 430. The device controller 203 can also extract the PRP list 445 needed for data transfer to the NVMe SSD 220. In alternative embodiments, the device controller 203 can determine and assemble the PRP list 445 (rather than receive the list as part of the NVMe write packet 430). When the device controller 203 receives a conventional CXL.io packet, the embedded data will be sent directly to the CXL DRAM device 225 (see FIG. 6 below).

FIG. 5 illustrates the same computer system 400 as FIGS. 4A and 4B above, but further illustrates a method 570 which employs a series of exemplary data processing and data transfer blocks to handle an NVMe read request 530 via a CXL.io packet 435.

In a first block 580, the host 110 generates an NVMe read command 530. The NVMe read command 530 includes a data block list 545 of a series of data blocks 522 which are to be read from the NAND flash storage such as the exemplary NVMe SSD 220.

In block 582, the NoC driver 405 wraps the NVMe read command 530 into a data field(s), parameter(s), or other data section(s) of a CXL.io packet 435. In block 584, the NoC driver 405 puts the CXL.io packet 435 with the wrapped NVMe write command 530 into the SQ 415. In block 586, the CXL.io packet 435 with the wrapped or embedded NVMe read command 530 is transferred to the device controller 203 of the SUDTM device 200.

The device controller 203 includes the command router 212, which has the necessary digital logic to parse the CXL.io packet 435. In block 588 the command router 212 identifies the NVMe read command 530 embedded in the packet 435, including the data block list 545. Based on that determination, the command router 212 can determine that the data associated with the NVMe read command 530 is to be read from the appropriate data blocks 522 of the NVMe SSD 220. In some embodiments, the command router is configured to parse the memory request by ascertaining a value of a flag in the memory request indicative of the memory access protocol.

In block 590, the command router 212 issues the read command 530 to the NVMe SSD 220 and so reads the data blocks 522. In block 592, the command router receives a read status back from the NVMe SSD 220. In a block 594 and depending on whether the data is meant to be written to the system DRAM 410 or the CXL DRAM device 225, the data is written to the appropriate PRPs 422 of the appropriate random-access memory. In block 596, the device controller 203 sends to the CQ 420 a signal that a status for the NVMe read command 530 should be updated to indicate completion of the command.

Figure 6:
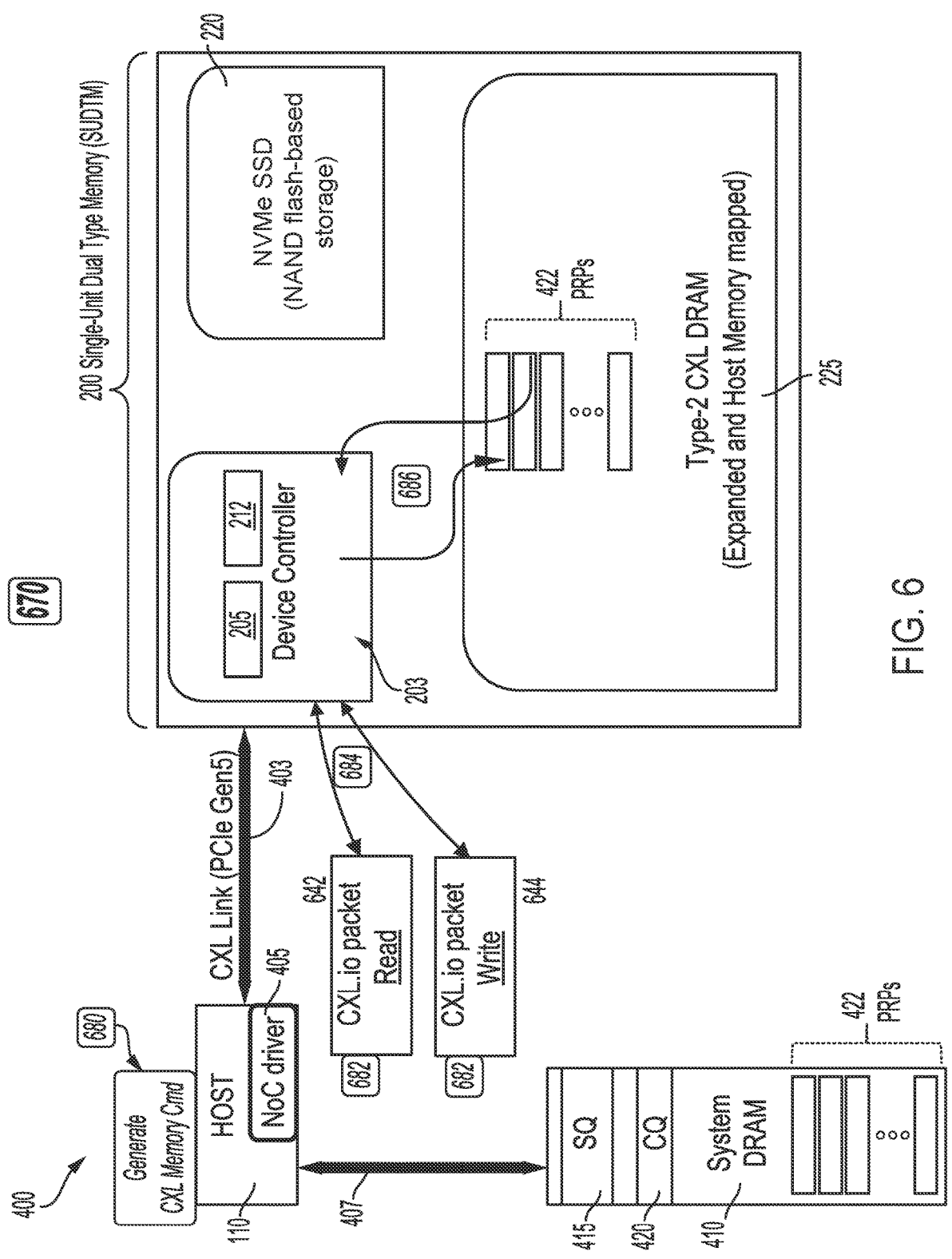
FIG. 6 presents a combined data flow illustration and flow chart for processing a CXL memory command via a CXL.io protocol according to the present embodiments.

FIG. 6 illustrates the computer system 400 depicted in FIGS. 4A, 4B, and 5 with respect to a method 670 for the processing of CXL memory read and write commands. Because the method 670 reflects an established CXL memory read/write protocol, many details have been omitted in FIG. 6.

In a first block 680 of the method 670, the host generates a memory read request or a memory write request. In block 682 the NoC driver 405 packages the read request or write request into standard CXL packet format 682. In block 684 a suitable CXL.io packet is retrieved by the device controller 684. In block 686 the command router 212 of the device controller 203 ensures that the CXL read/write command is processed by the CXL DRAM device 225.

Accordingly, FIG. 6 illustrates that when the host 110 issues a CXL memory read command or memory write command, the embodiments employ the existing operations and protocols of CXL to process the commands.

Viewed together, the methods 470, 570, 670 of FIGS. 4B, 5, and 6 may be understood as processing CXL read/write commands 642, 646 and NVMe read/write commands 430, 530, through the device controller 203. The method 670 may be performed according to suitable computer code implemented via software such as the NoC driver 405 and hardware such as the device controller 203.

The method 670 determines whether a memory access command generated by the host system 110 is a NVM command 430, 440 for memory read/write operations. to be performed via a non-volatile (NV) memory coupled with the host system; or is a CXL dynamic random access memory command 642, 644 (for either of a memory read operation or a memory write operation).

If the memory access is a NVM command, the NoC driver 405 of the host 110 wraps the NVMe memory command structure 430, 530 within a CXL command packet 435. The CXL packet 435 is then stored in the SQ 415 associated with the host system 110. The CXL packet 435 is then sent from the SQ 415 to the device controller 203 of single-unit, dual-type memory device 200 which includes an integrated NAND flash memory storage such as the exemplary NVMe SSD 220. The device controller 203 extracts the NVMe memory command 430, 530 from the CXL command packet 435. The device controller 203 then hands off the NVMe memory command 430, 530 to the NVMe SSD 220 for processing.

If the memory access is a CXL command, the NoC driver 405 assembles the read or write command according to the CXL protocol in a CXL.io packet 642, 644. The packet is stored in the SQ 415, and from there is received by the device controller 203 of the single-unit, dual-type memory device 200 which also includes an integrated Type-2 CXL DRAM 225. The device controller 203 then hands off the CXL memory command 642, 644 to the CXL DRAM device 225 for processing.

In the embodiments, the NoC driver 405 works through extended mailbox support. That is, the NoC driver 405 can send NVMe packets using the CXL.io mailbox protocol. The extra NVMe commands 315 in the NoC driver 405 result in a combined driver. If the host 110 issues a block storage command, which is NVMe, the host 110 will employ the CXL interface through the doorbell mechanism which is an element of the CXL.mem protocol.

The present embodiments are meant to be operational in standard computer systems, which may include a standard consumer/business laptop or a server. The embodiments provide for the use of the NVMe protocol over the CXL.io protocol. Accordingly, the NVMe SSD 220 with the CXL DRAM device 225 can be consolidated on a single memory card (e.g., the SUDTM device 200), with the device controller 203. This amalgamates the front end architecture for the device controller 203, which can then handle both the NVMe and CXL.io packets. As a result, the device controller 203 can serve as a single resource for storing/retrieving both DRAM and non-volatile storage needs.

This functionality is analogous to processing of the mailbox commands in the CXL.io protocol. The memory device controller 203 can distinguish the NVMe packets from the CXL.io packets.

One significant advantage of the embodiments is that the host 110 can get extra DRAM and flash storage on a single unified drive. The host 110 can utilize the memory-mapped DRAM space on the SUDTM device 200 in host bias mode and can relinquish control when not needed. When the extra DRAM space is not needed, the system can use the extra space for enhanced bandwidth for burst writes going to flash.

Thus, advantages of the present embodiments compared with legacy systems include, among other things, (i) a single unified front end architecture for both the CXL DRAM device 225 and the flash memory-based NVMe SSD 220, (ii) an ability to use the SUDTM device 200 as an accelerator in type-2 host bias mode, and (iii) significant cost savings from having only one memory controller in place of two.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus comprising:
   a first memory comprising a dynamic random access memory (DRAM), wherein the DRAM is volatile and configured for data reads and writes according to a first memory access protocol;
   a second memory comprising a non-volatile (NV) memory configured for data reads and writes according to a second memory access protocol, wherein the first memory access protocol and the second memory access protocol are different hardware interface protocols; and
   a shared device controller configured to:
      receive memory requests comprising DRAM write request packets formatted according to the first memory access protocol;
      parse a given memory request according to the first memory access protocol and, upon detecting a memory write request indicator, identify a non-volatile memory express (NVME) write command embedded in a memory request packet associated with the given memory request;
      determine if the given memory request received from a host system is a write request
      (i) destined for the first memory when the given memory request comprises a DRAM write request packet without the memory write request indicator or
      (ii) destined for the second memory because the given memory request comprises a DRAM write request packet comprising the memory write request indicator indicating a data transfer to the second memory;
      write to the DRAM using the first memory access protocol when the given memory request received from the host system is determined to be the write request destined for the first memory; and
      when the given memory request is determined to be the write request destined for the second memory, extract a physical region page (PRP) list from the identified NVME write command and perform the write to the NV memory using the second memory access protocol and the extracted PRP list, without requiring host resubmission or conversion by the host system.

2. The apparatus of claim 1, wherein the shared device controller comprises:
   a command router configured to receive the given memory request and to parse the given memory request to determine a memory destination from among the first memory and the second memory.

3. The apparatus of claim 2, further comprising a front end configured to interface with both of a bus of the host system and the command router, wherein the command router receives the given memory request from the host system via the front end.

4. The apparatus of claim 1, wherein the first memory and the second memory together form a single unit dual type memory, wherein the single unit dual type memory comprises physical region pages that correspond to physical region pages of a system volatile memory separate from the single unit dual type memory.

5. The apparatus according to claim 1, wherein the DRAM is configured to be expanded and host memory mapped.

6. The apparatus according to claim 1, wherein the shared device controller is configured to cause data associated with a write command destined for the second memory to be stored in physical region pages in one of the first memory and a system DRAM, before the data is written to the second memory in accordance with the write command.

7. The apparatus according to claim 6, wherein the shared device controller is configured to cause the data associated with the write command destined for the second memory to be stored in the physical region pages of the first memory, before the data is written to the second memory in accordance with the write command.

8. The apparatus according to claim 1, wherein the shared device controller is configured to determine and assemble the PRP list.

9. A tangible, non-transitory, computer readable storage medium comprising instructions which, when executed by a processor of a host system, causes the processor to execute a method comprising:

accessing a first memory comprising a dynamic random access memory (DRAM) being volatile and accessed via a first memory access protocol, and accessing a second memory comprising a non-volatile (NV) memory, via a second memory access protocol, wherein the first memory access protocol and the second memory access protocol are different hardware interface protocols;

parsing a given memory access command according to the first memory access protocol and, upon detecting a memory write request indicator, identifying a non-volatile memory express (NVME) write command embedded in a memory request packet associated with the given memory access command;

determining if the given memory access command generated by the host system is a write request (i) destined for the first memory when the given memory access command comprises a DRAM memory write request packet without the memory write request indicator or (ii) destined for the second memory to be performed via the NV memory coupled with the host system, because the given memory access command comprises a DRAM write request packet with the memory write request indicator indicating a data transfer to the second memory;

wherein when the given memory access command is determined to be a write request destined for the second memory, extracting a physical region page (PRP) list from the identified NVME write command and performing the write to the NV memory using the second memory access protocol and the extracted PRP list, without requiring host resubmission or conversion by the host system; and when the given memory access command is determined to be a write request destined for the first memory, data is written to the first memory.

10. The tangible, non-transitory, computer readable storage medium of claim 9, further comprising storing the command packet in a submission queue (SQ) associated with the host system.

* * * * *